(12) United States Patent
Chen (10) Patent No.: US 8,500,061 B2
(45) Date of Patent: Aug. 6, 2013

(54) AIRCRAFT WITH VTOL TECHNOLOGY

(76) Inventor: Li Jing Chen, Bougival (FR)

( * ) Notice: Subject to any disclaimer, the term of this patent is extended or adjusted under 35 U.S.C. 154(b) by 339 days.

(21) Appl. No.: 12/926,629

(22) Filed: Dec. 1, 2010

(65) Prior Publication Data
US 2011/0226890 A1  Sep. 22, 2011

(30) Foreign Application Priority Data

Dec. 11, 2009 (FR) .................................. 09 05991
Jul. 19, 2010 (FR) .................................. 10 03019

(51) Int. Cl.
*B64C 29/00* (2006.01)
(52) U.S. Cl.
USPC ....................... 244/12.5; 244/129.4; 244/45 R
(58) Field of Classification Search
USPC ................ 244/12.5, 129.4, 23 D, 23 C, 45 R, 244/12.1
See application file for complete search history.

(56) References Cited

U.S. PATENT DOCUMENTS

| | | | | |
|---|---|---|---|---|
| 4,109,885 A | * | 8/1978 | Pender | 244/7 R |
| 4,848,701 A | * | 7/1989 | Belloso | 244/12.5 |
| 5,433,400 A | * | 7/1995 | Singhal et al. | 244/12.1 |
| 6,260,794 B1 | * | 7/2001 | Rowe | 244/12.5 |
| 6,318,668 B1 | * | 11/2001 | Ulanoski et al. | 244/12.5 |
| 6,371,407 B1 | * | 4/2002 | Renshaw | 244/12.5 |
| 6,520,450 B1 | * | 2/2003 | Seyfang | 244/12.5 |
| 8,020,804 B2 | * | 9/2011 | Yoeli | 244/23 D |
| 2009/0121073 A1 | * | 5/2009 | Doane et al. | 244/12.5 |
| 2011/0226890 A1 | * | 9/2011 | Chen | 244/12.5 |

* cited by examiner

*Primary Examiner* — Christopher P Ellis
*Assistant Examiner* — Medhat Badawi
(74) *Attorney, Agent, or Firm* — Jackson Patent Law Office (57) ABSTRACT

An aircraft includes a jet engine with a downward deflectable propelling nozzle; an auxiliary power unit with a downward deflectable propelling nozzle; and a transformable wing. The transformable wing includes a fixed wing, hydraulic sleeve, an air intake duct including an upper wall and a lower wall, a thin wing connected to the hydraulic sleeve, a sliding wing, leading edge flaps, trailing edge flaps, an aileron, and a hinge. The transformable wing is configured, during vertical take-off/landing, to transform such that a leading end to an air intake duct in a vertical direction is formed on the fixed wing, and the air intake duct is formed internally in and along a direction of the wingspan of the fixed wing to cause air taken in by the jet engine to flow, in a common direction, over upper and lower surfaces of the thin wing, thereby generating lift for vertical take-off/landing.

4 Claims, 10 Drawing Sheets

AIRCRAFT WITH VTOL TECHNOLOGY

CROSS-REFERENCE TO RELATED APPLICATION

This Application is claims foreign priority benefit under 35 U.S.C §119 of Patent Application FR2010/0003019 filed on 19 Jul. 2010, and Patent Application FR2009/0005991 filed on 11 Dec. 2009, the contents of which are herein incorporated by reference.

BACKGROUND OF THE INVENTION

1. Field of the Invention This invention relates to aircraft and, more particularly, to aircraft with VTOL technology.

2. Description of related art

Currently, VTOL is only possible for aircraft with a thrust-to-weight ratio equal to or greater than 1 because of the limitation of traditional VTOL technologies which, without exception, get the lift force in vertical direction for VTOL from a downward-directed propelling nozzle of a jet engine solely, or its combination with a lift fan.

BRIEF SUMMARY OF THE INVENTION

An aircraft to achieve vertical take-off and landing (VTOL), the aircraft comprising: a jet engine with a downward deflectable propelling nozzle; an auxiliary power unit with a downward deflectable propelling nozzle; and a transformable wing comprising a fixed wing, a hydraulic sleeve, an air intake duct including an upper wall and a lower wall, a thin wing connected to the hydraulic sleeve and located between the upper and lower walls, a sliding wing, leading edge flaps, trailing edge flaps, an aileron, and a hinge, the transformable wing being configured, during vertical take-off/landing, to transform such that a leading end to an air intake duct in a vertical direction is formed on the fixed wing, and the air intake duct is formed internally in and along a direction of the wingspan of the fixed wing to cause air taken in by the jet engine to flow, in a common direction, over upper and lower surfaces of the thin wing, a chord line of the thin wing being in the direction of the wingspan of the fixed wing, thereby generating lift for vertical take-off/landing, the transformable wing being configured, during forward flight, to restore a normal shape in order to reduce drag, the aircraft further including an assembly, which is an integral and inseparable part of the transformable wing, the assemble including an extended section of air intake duct, an openable and closable leading end to air intake duct in horizontal direction, and an openable and closable leading end to air intake duct in vertical direction.

DETAILED DESCRIPTION OF EMBODIMENTS OF THE INVENTION

Embodiments of the invention can achieve VTOL on aircraft whose thrust-to-weight ratio is smaller than 1. According to its first characteristic, the embodiments can obtain or generate another lift force for VTOL, in addition to the lift force obtained by traditional ways, by horizontally setting a Thin Wing at the middle of the perpendicular line of the horizontal section inside the Air Intake Duct. According to the characteristics of the embodiments, the following are true:

The Thin Wing is a part of the Air Intake Duct and is attached to the inner wall of the latter in a fixed or flexible way. The Thin Wing will produce a lift force when air flows over it and the produced lift force will be then transmitted to the inner wall of the Air Intake Duct to lift the aircraft off the ground.

The Thin Wing is designed such that its area and shape take into full consideration the air inflow of the jet engine and can ensure the produced lift force will be greater than the difference between the maximum take-off weight and the vertical thrust of an aircraft.

The entire or part of the Air Intake Duct with a Thin Wing can be fixed or formed through the transformation of components of an aircraft.

The entire or part of the Air Intake Duct with a Thin Wing can be fitted to the fuselage or wings of an aircraft.

The leading end of the Air Intake Duct with a Thin Wing in horizontal direction can be opened or closed.

The leading end of the Air Intake Duct with a Thin Wing in vertical direction can be opened or closed.

Figure 1:
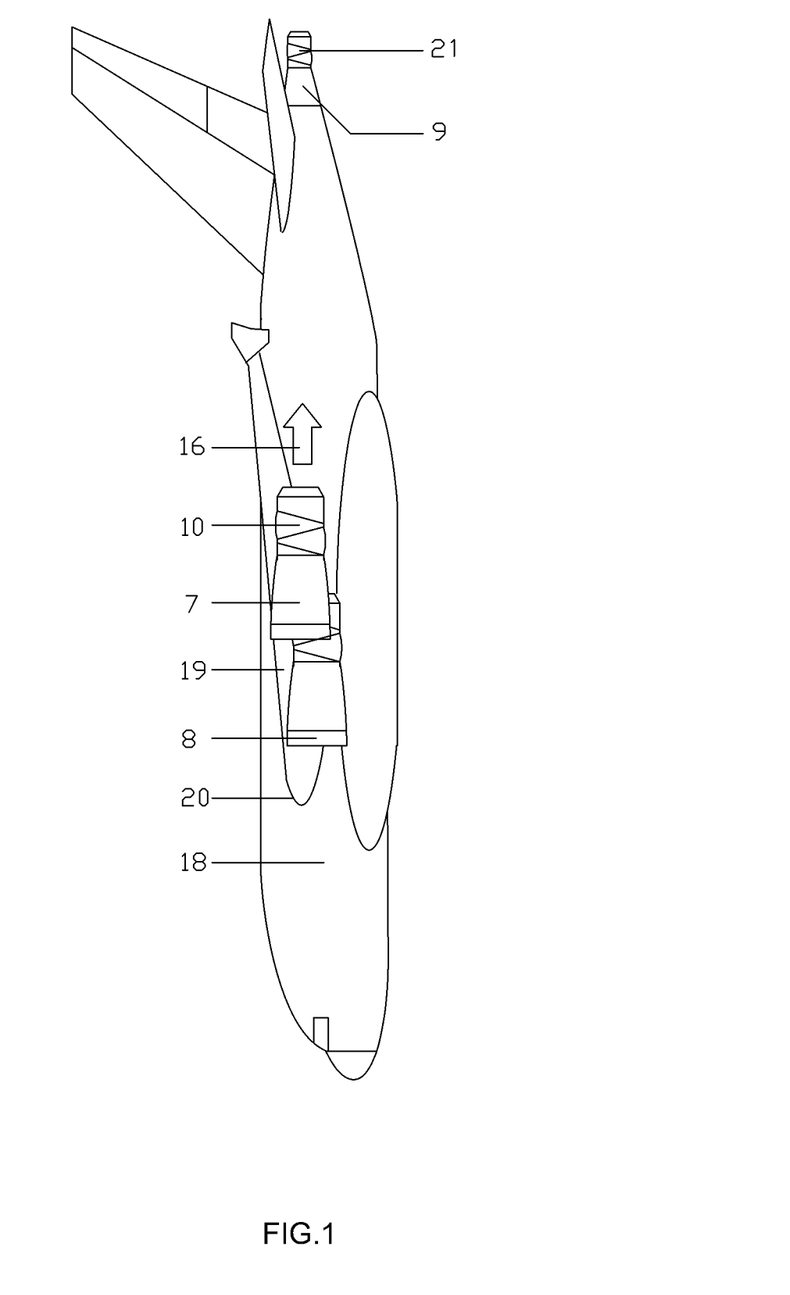
FIG. 1 is a side view of an aircraft with this invention on ground (without landing gear) and during horizontal flight.
Figure 2:
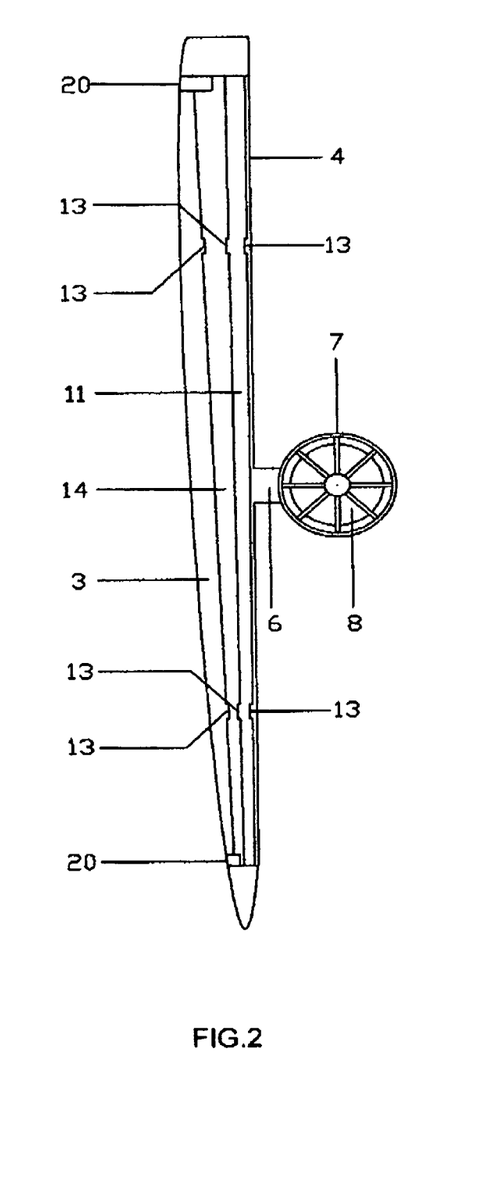
FIG. 2 is a front view of the transformable wings of an aircraft with this invention on ground and during horizontal flight.
Figure 6:
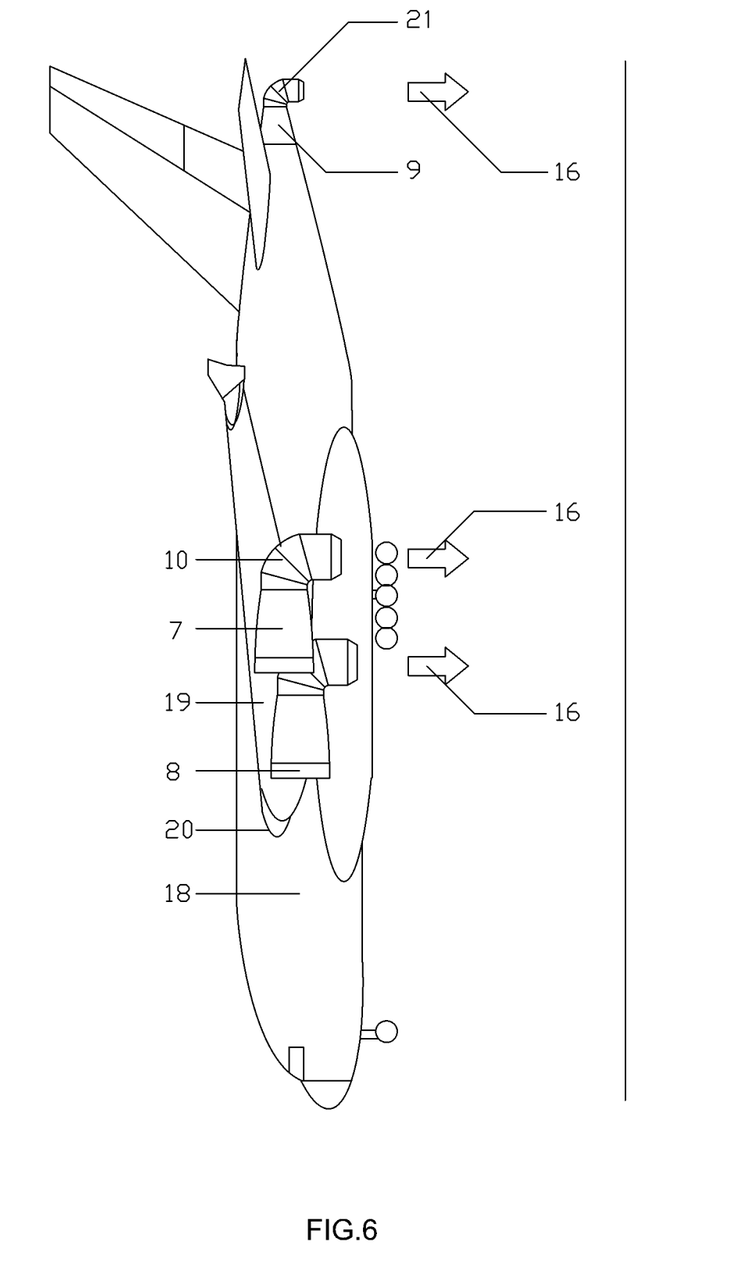
FIG. 6 is a side view of an aircraft with this invention during vertical taking off and landing.
Figure 7:
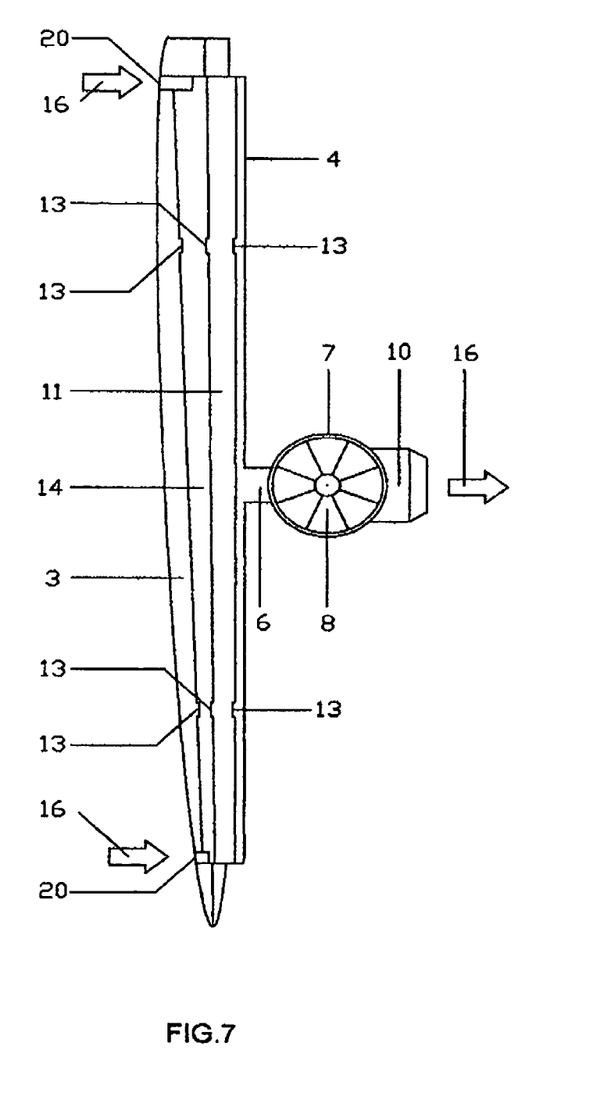
FIG. 7 is a front view of the transformable wings of an aircraft with this invention during vertical taking off and landing.

As illustrated in FIGS. 1, 2, 6 and 7, an aircraft with this invention is mainly made up of a fuselage (18), transformable wings (19), an extended section (6) of the air intake duct for the wing, an openable/closable leading end (8) of the air intake duct in horizontal direction and that (20) in vertical direction, a jet engine (7) with a propelling nozzle (21) that can be directed downward, and an APU (9) with a propelling nozzle (10) that can be directed downward. The air intake duct (5) formed by the transformable wing (19), together with the extended section (6) of the air intake duct for the wing, jointly forms an intake duct (5,6) with a thin wing (2) to produce an additional lift force besides the one produced by traditional technologies.

Figure 3:
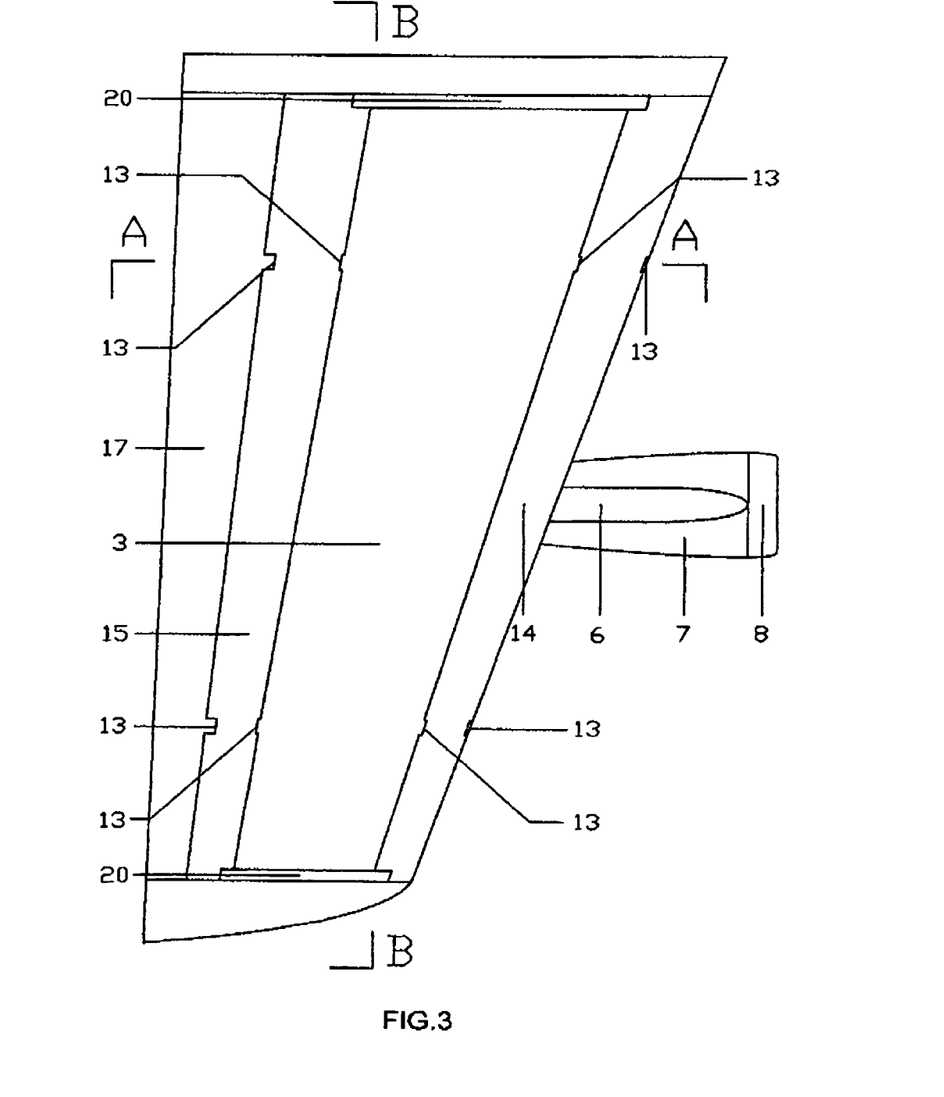
FIG. 3 is a top view of the transformable wings of an aircraft with this invention on ground and during horizontal flight.
Figure 4:
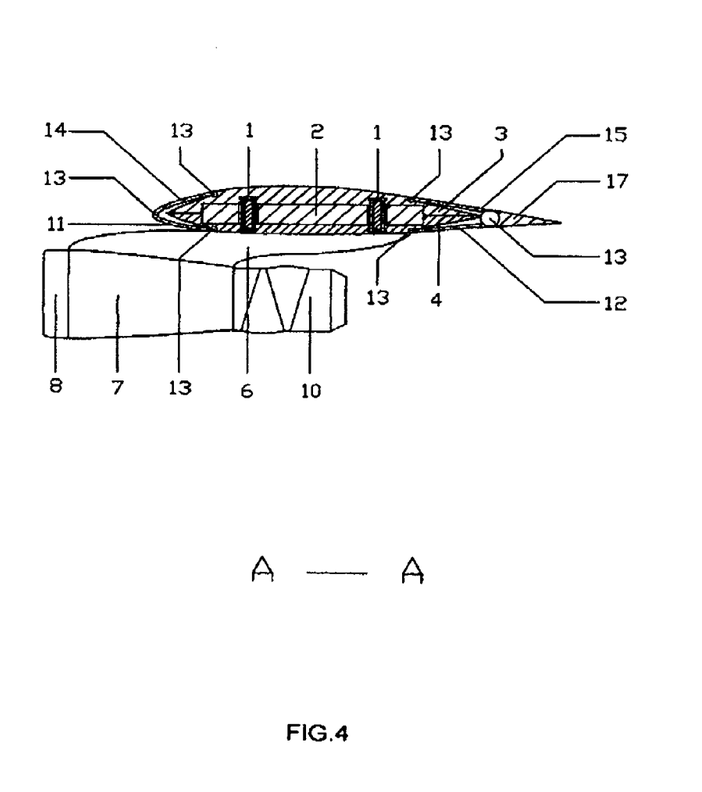
FIG. 4 is A-A Section for FIG. 3.
Figure 5:
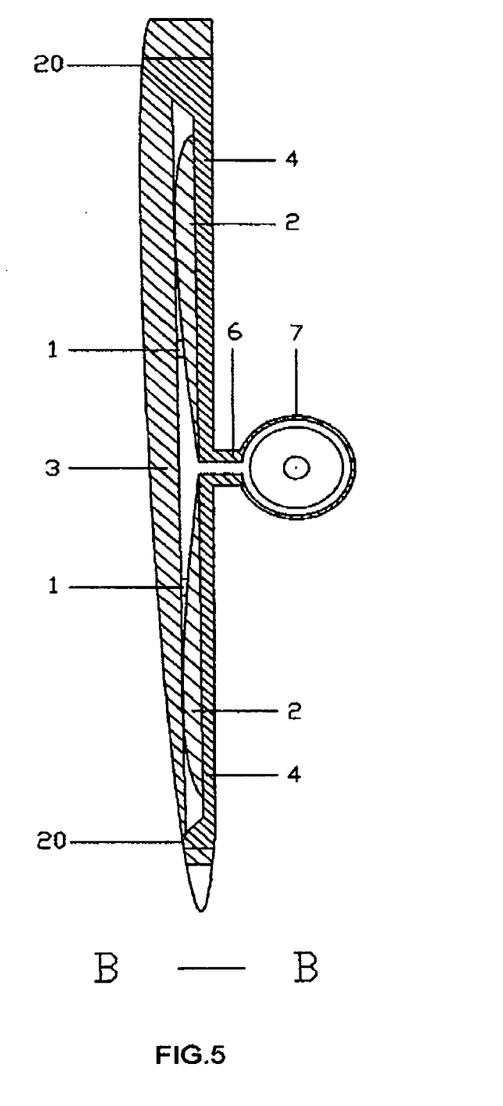
FIG. 5 is B-B Section for FIG. 3
Figure 8:
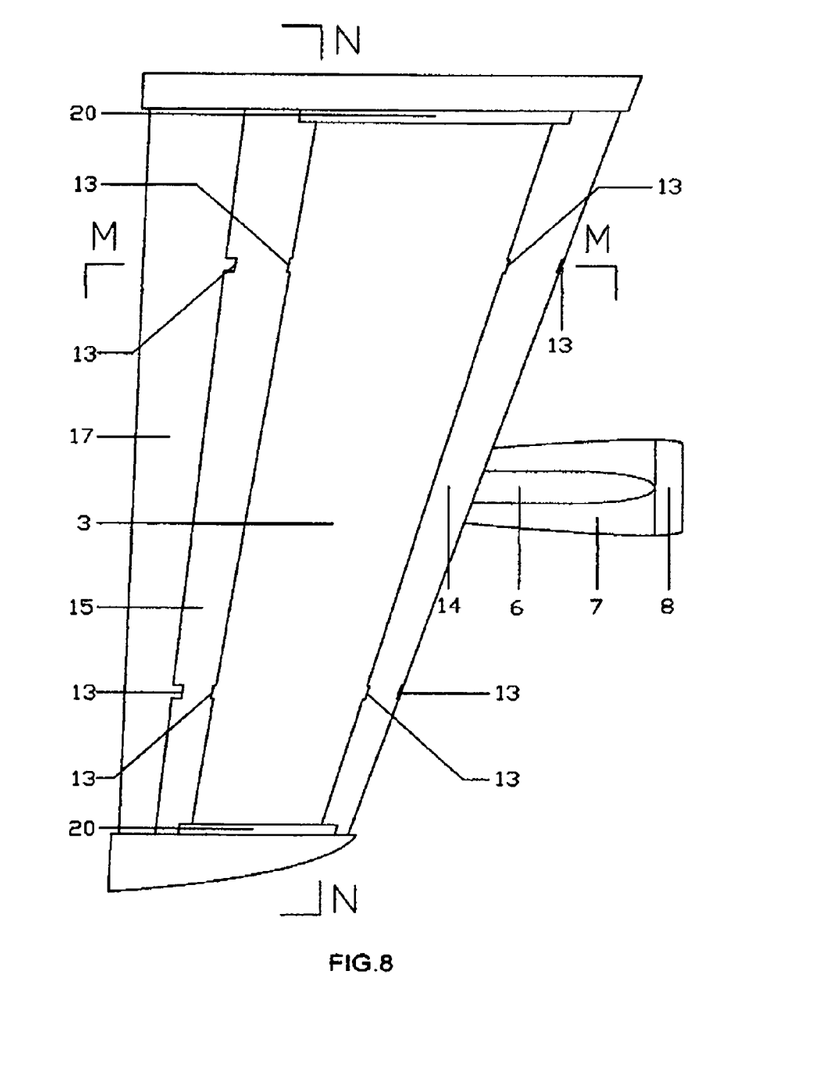
FIG. 8 is a top view of the transformable wings of an aircraft with this invention during vertical taking off and landing.
Figure 9:
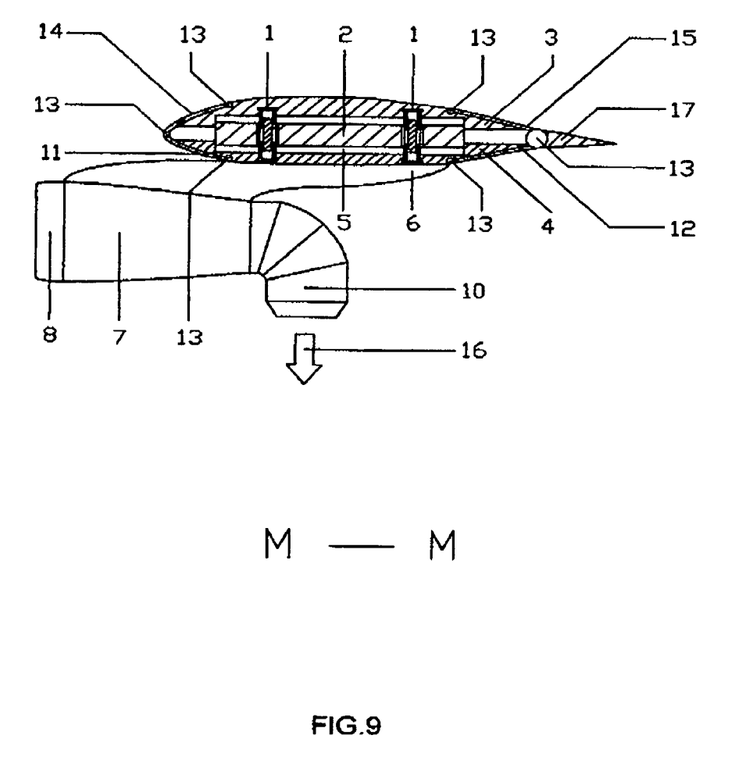
FIG. 9 is M-M Section for FIG. 8
Figure 10:
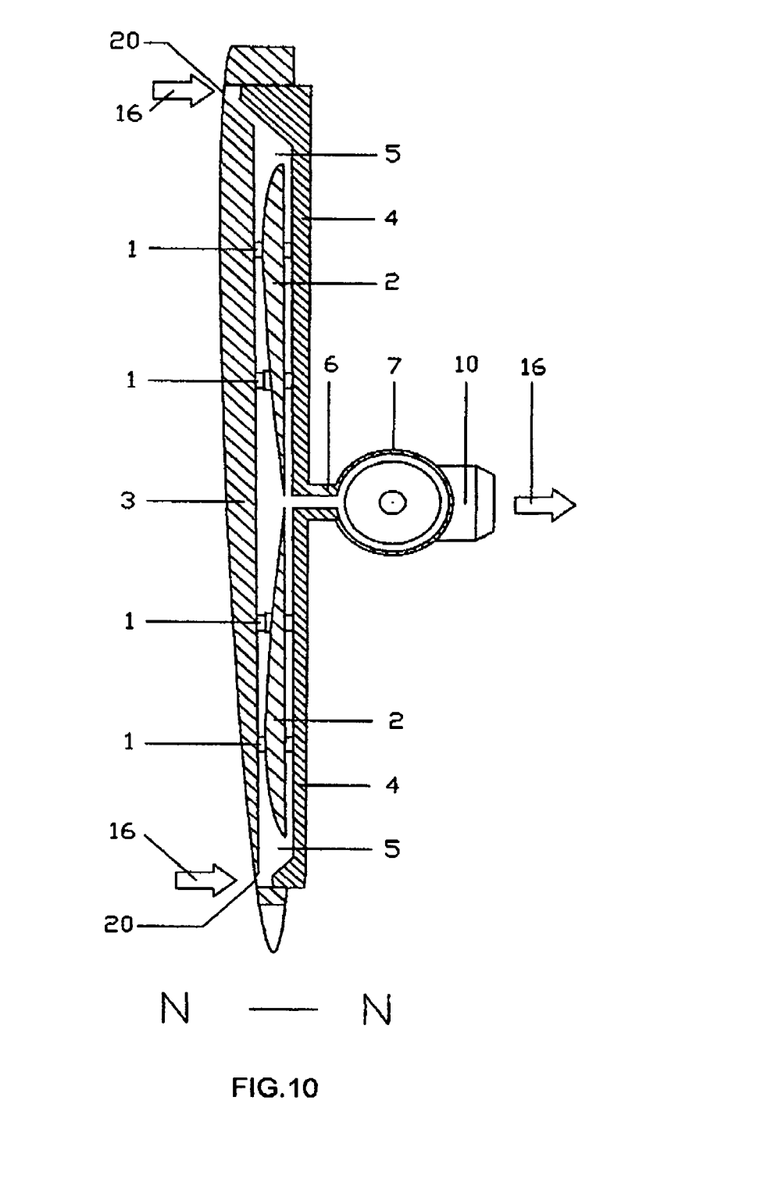
FIG. 10 is N-N Section for FIG. 8

As illustrated in FIGS. 3, 4, 5, 8, 9 and 10, the transformable wing (19) is made up of a fixed wing (3), a hydraulic sleeve (1), a thin wing (2), a sliding wing (4), a leading edge flap (11,14) and a trailing edge flap (12,15), aileron (17) and hinge (13).

When taking off from the ground, the Fixed Wing (3) of the Transformable Wing (19) is fixed to the Fuselage (18), and the Sliding Wing (4) and Thin Wing (2), under the action of the Hydraulic Sleeve (1), will go down to a position where the Leading End (20) of the Air Intake Duct in vertical direction will open and the Jet Engine (7), with the Leading (8) End of the Air Intake Duct in horizontal direction closed, can freely take air in from the Air Intake Duct (5) of the Transformable Wing (19) at a flow rate enough for the Thin Wing (2) to produce a lift force for VTOL. At the same time, the upper (14) and lower part (11) of the Leading Edge Flap and the upper (15) and lower part (12) of the Trailing Edge Flap as well as the Aileron (17) begin to rotate around the Hinge (13) to increase the lift for the transition between vertical taking off/landing and horizontal flight. The Leading End (8) of the Air Intake to the Jet Engine (7) is closed to prevent the aircraft from horizontal movement and to increase the Air Flow (16) through the Air Intake Duct (5,6) with a Thin Wing (2). Also, the horizontal thrust generated by the Jet Engine (7) will be directed downward by the Propelling Nozzle (10). Then, the Jet Engine (7) starts to increase the thrust gradually. Now, the Air (16) flows through the Air Intake Duct (4) which is formed as the Sliding Wing and Thin Wing are going down. Because the velocity of the Air flowing over the upper surface of the Thin Wing (2) within the Air Intake Duct (5) of the Transformable Wing (19) is higher than that over the lower surface of the Thin Wing (2), and according to Bernoulli's Principle stating an increase in the speed occurs simultaneously with a decrease in pressure, we know that there will be a lift force produced on the wing due to the lower pressure on the upper surface of the Thin Wing (2) than that on the lower surface of the Thin Wing (2). And this Lift Force is then transmitted to the fuselage through the Hydraulic Sleeve (1) and Fixed Wing (3). Again, this force is never seen before and is an essential feature distinguishing the present invention from any other VTOL technology. The Thin Wing (2) is designed such that its area and shape take into full consideration the air inflow of the Jet Engine (7) and can ensure the produced lift force will be greater than the difference between the maximum take-off weight and the vertical thrust of an aircraft. The Air Intake Duct (5) of the Transformable Wing (19) is extended to the Jet Engine (7) through an extended section (6) (a suspended arm in this case). The air flows through the Air Intake Duct (5) of the Transformable Wing (19) and the Extended Section (6) (a suspended arm in this case) of the Air Intake Duct of the Wing and enters into the Jet Engine (7) where the air is burned and blown out of the Propelling Nozzles (10) which is now directed downward to generate lift force to lift the aircraft off the ground. There are now two lift forces to achieve VTOL, i.e. one generated by the Air (16) flowing through the Air Intake Duct (5,6) with a Thin Wing (2) and the other one generated by the high-temp burned air thrown out of the downward-directed Propelling Nozzles (10) of the Jet Engine (7) and (21) of the APU (9). The Hydraulic Sleeve (1) now can drive the left and right Sliding Wing (4) to move up and down to balance the aircraft horizontally during vertical taking off and landing, correspondingly, the vertical balance can be controlled by adjusting the angle at which the Propelling Nozzles (10) of the Jet Engine (7) and (21) of the APU (9) are directed downward.

A transition to horizontal flight from vertical taking off can be achieved by performing the above steps in reverse order. Similarly, a transition to vertical landing from horizontal flight can be achieved by repeating these steps.

All the formulas and calculations for this invention are listed in Annex 1.

All the formulas and calculations used to retrofit an Airbus A-380 based on this invention are listed in Annex 2.

This invention can be used to retrofit an existing aircraft to achieve VTOL or manufacture a VTOL aircraft with a thrust-to-weight ratio smaller than 1.

ANNEX 1

| | | |
|---|---|---|
| $m$ | S/N of Jet Engine | (Dimensionless Unit) |
| $n$ | S/N of Thin Wing | (Dimensionless Unit) |
| $F$ | Total Lift Force of Thin Wing m | (Unit: kg) |
| $F_n$ | Lift Force of Thin Wing | (Unit: kg) |
| $G$ | Maximum Take-Off Weight of Aircraft | (Unit: kg) |
| $S_m m$ | S/N of Jet Engine | (Dimensionless Unit) |
| $S_m$ | Area of Air Intake to Jet Engine | (Unit: m$^2$) |
| $F_m$ | Jet Engine Thrust | (Unit: kg) |
| $S_n$ | Area of Air Intake at the Leading End of Thin Wing | (Unit: m$^2$) |
| $\rho$ | Air Density | (Unit: kg/m$^3$) |
| $q_m$ | Air Intake of Jet Engine | (Unit: kg/s) |
| $V_n\infty$ | Air Flow at the Leading End of Thin Wing | (Unit: m/s) |
| $a$ | Sonic Speed | (Unit: m/s) |
| $Ma_n\infty$ | Mach Number = $V_n \infty/a$ | (Dimensionless Unit) |
| $\lambda_n$ | Aspect Ratio of Thin Wing | (Dimensionless Unit) |
| | (Taking the ratio of the line between the midpoints of left and right edge of the Thin Wing to that between the leading and trailing edge) | |
| $C_{nL}$ | Lift Coefficient of Thin Wing | (Dimensionless Unit) |
| $C_{na}$ | Lift Curve Slope of Thin Wing | (Unit: 1/rad) |
| $c_a$ | Lift Curve Slope of Aerofoil of Thin Wing = $2\pi$ | (Unit: 1/rad) |
| $\alpha_n$ | AOA of Aerofoil of Thin Wing | (Unit: rad) |
| $\alpha_{nL=0}0$ | Zero-Lift AOA of Aerofoil of Thin Wing | (Unit: rad) |
| $e$ | Span Efficiency Factor | (Dimensionless Unit) |

Oswald's Efficiency Factor=(0.7-0.8)

The Thin Wing can be viewed that the length of the line between the midpoints of the left and right edges is the wingspan, that between the leading and trailing edge is the chord length and the aerofoil is a straight wing taking as its chord line the line between the midpoints of the leading and trailing edges.

$$F=\Sigma F_n \qquad (1)$$

$$F_n = \tfrac{1}{2}\rho V^2_n \infty S_n C_{nL} \qquad (2)$$

| | | |
|---|---|---|
| | Area of Air Intake to Jet Engine | (Unit: m$^2$) |
| $F_m$ | Jet Engine Thrust | (Unit: kg) |
| $S_n$ | Area of Air Intake at the Leading End of Thin Wing | (Unit: m$^2$) |
| $\rho$ | Air Density | (Unit: kg/m$^3$) |
| $q_m$ | Air Intake of Jet Engine | (Unit: kg/s) |
| $V_n\infty$ | Air Flow at the Leading End of Thin Wing | (Unit: m/s) |
| $a$ | Sonic Speed | (Unit: m/s) |
| $Ma_n\infty$ | Mach Number = $V_n \infty/a$ | (Dimensionless Unit) |
| $\lambda_n$ | Aspect Ratio of Thin Wing | (Dimensionless Unit) |
| | (Taking the ratio of the line between the midpoints of left and right edge of the Thin Wing to that between the leading and trailing edge) | |
| $C_{nL}$ | Lift Coefficient of Thin Wing | (Dimensionless Unit) |
| $C_{na}$ | Lift Curve Slope of Thin Wing | (Unit: 1/rad) |
| $c_a$ | Lift Curve Slope of Aerofoil of Thin Wing = $2\pi$ | (Unit: 1/rad) |
| $\alpha_n$ | AOA of Aerofoil of Thin Wing | (Unit: rad) |
| $\alpha_{nL=0}0$ | Zero-Lift AOA of Aerofoil of Thin Wing | (Unit: rad) |
| $e$ | Span Efficiency Factor | (Dimensionless Unit) |
| | Oswald's Efficiency Factor = (0.7-0.8) | |

The Thin Wing can be viewed that the length of the line between the midpoints of the left and right edges is the wingspan, that between the leading and trailing edge is the chord length and the aerofoil is a straight wing taking as its chord line the line between the midpoints of the leading and trailing edges.

$$Ma_n\infty = V_n\infty/a \qquad (3)$$

$$V_{n\infty} = \frac{q_m}{\rho} \times \frac{S_n^2}{S_m} (m = 1, 2, 3 \ldots) \quad (4)$$

$$C_{nL} = C_{na}(\alpha_n - \alpha_{nL=0}) \quad (5)$$

When $\lambda_n \geq 5$:
For low-speed flow $$C_{na} = \frac{c_a}{1 + \frac{c_a}{\pi e \lambda_n}} = \frac{2\pi}{1 + \frac{2}{e\lambda_n}} \quad (6)$$

$(Ma_{n\infty} < 0.3)$

For subsonic flow $$C_{na} = \frac{c_a/\sqrt{1-Ma_{n\infty}^2}}{1 + \frac{c_a\sqrt{1-Ma_{n\infty}^2}}{\pi e \lambda_n}} = \frac{2\pi/\sqrt{1-Ma_{n\infty}^2}}{1 + \frac{2\sqrt{1-Ma_{n\infty}^2}}{e\lambda_n}} \quad (7)$$

$(0.3 < Ma_{n\infty} < 0.8)$

For supersonic flow $$C_{na} = \frac{4}{\sqrt{M_{an\infty} - 1}} \quad (8)$$

$(Ma_{n\infty} > 0.8)$

When $\lambda_n < 5$:
For low-speed flow $$C_{na} = \frac{c_a}{\sqrt{1 + Ma_{n\infty}^2 + [c_a/(\pi\lambda_n)]^2} + c_a/(\pi\lambda_n)}$$

$$= \frac{2\pi}{\sqrt{1 + Ma_{n\infty}^2 + (2/\lambda_n)^2} + 2/\lambda_n} \quad (9)$$

$(Ma_{n\infty} < 0.3)$

For subsonic flow $$C_{na} = \frac{c_a}{\sqrt{1 + Ma_{n\infty}^2 + [c_a/(\pi\lambda_n)]^2} + c_a/(\pi\lambda_n)}$$

$$= \frac{2\pi}{\sqrt{1 - Ma_{n\infty}^2 + (2/\lambda_n)^2} + 2/\lambda_n} \quad (10)$$

$(0.3 < Ma_{n\infty} < 0.8)$

For supersonic flow $$C_{na} = \frac{4}{\sqrt{Ma_{n\infty}^2 - 1}}\left(1 - \frac{1}{2\lambda_n\sqrt{Ma_{n\infty}^2 - 1}}\right) \quad (11)$$

$(Ma_{n\infty} < 0.8)$

VTOL can be achieved once $F + \Sigma F_m \geq G$

Formula (5) through (11) are taken directly from the literature *Aerodynamics*(Ch. 4, Vol. 1, edit by Wu Ziniu Tsinghua University Press, Beijing, April, 2007) and *Aircraft Performance and Design*(Ch. 3, Anderson Jr D J. New York: McGraw-Hill, 1999)

S (Total Wing Area)=845 m
G (Maximum Take-Off Weight)=560,000 kg
$\Sigma F_m$ (Total Jet Engine Thrust)=1,208,000/9.8≈123,265 kg
$q_m$ (Air Flow to Trent900 Jet Engine)=2,745×0.4536≈1,245 kg/s
$R_m$ (Dia. of Air Intake to Trent900 Jet Engine)=0.91 m²

Assuming:
m (SIN of Trent900Jet Engine)=1~4
n (S/N of Thin Wing)=1~8
S (Total Area of Thin Wing)=0.8×S=0.8×845=676 m²
ρ (Air Density)=1.297 kg/m³
Sm (Area of Air Intake to Trent900 Jet Engine)
$S_n$ (Area of Air Intake at the Leading End of Thin Wing)

$$\lambda_n \text{ (Aspect Ratio of Thin Wing)} = \frac{\frac{4}{35}}{4} \approx 0.457$$

$\alpha_n - \alpha_{nL=0}$ (AOA of Aerofoil-Zero-Lift AOA of Aerofoil for Thin Wing)

=3.4°×π/180≈0.059 rad

It can be obtained from the above:

$S_m = \pi \times (\frac{1}{2} \times R_m)^{2=3.14} \times (\frac{1}{2} \times 0.91) \approx 0.65$ m²

$S_n = \frac{1}{2}S_m = \frac{1}{2} \times \pi R_m^2 = \frac{1}{2} \times 3.14 \times (\frac{1}{2} \times 0.91) = 0.325$ m²

$$V_{n\infty} = \frac{q_m}{\rho} \times \frac{S_n^2}{S_m} = \frac{1245}{1.297} \times \frac{0.325^2}{0.65} \approx 155.985 \text{ m/s } (m = 1 \sim 8) \quad (4)$$

$$Ma_{n\infty} = V_{n\infty}/a = \frac{155.985}{340} \approx 0.459$$

$$C_{na} = \frac{c_a}{\sqrt{1 - Ma_{n\infty}^2 + [c_a/(\pi\lambda_n)]^2} + c_a/(\pi\lambda_n)} \quad (10)$$

$(0.3 < Ma_{n\infty} < 0.8)$ $$= \frac{2\pi}{\sqrt{1 - Ma_{n\infty}^2 + (2/\lambda_n)^2} + 2/\lambda_n}$$

$$= \frac{2 \times 3.14}{\sqrt{1 - 0.459^2 + (2/0.457)^2} + 2/0.457}$$

$\approx 0.71$ /rad $$C_{nL} = C_{na}(\alpha_n - \alpha_{nL=0}) \quad (5)$$
$= 0.71 \times 0.059$
$\approx 0.042$ -continued $$F = \sum F_n \quad (1)$$
$$= \sum \frac{1}{2}\rho V_{n\infty}^2 S_n C_{nL}$$
$$= \frac{1}{2}\rho V_{n\infty}^2 C_{nL} S$$
$$= \frac{1}{2} \times 1.297 \times 155.985^2 \times 0.042 \times 676$$
$$\approx 447{,}993 \text{ (kg)}$$

$F+\Sigma F_m = 447{,}993 + 123{,}265 = 571{,}258$ (kg)

$G = 560{,}000$ (kg)

$$F \times \Sigma F_m > G \quad (1)$$

It is clearly demonstrated above that VTOL is achievable on Airbus A380 once remodeled as shown.

The invention claimed is:

1. An aircraft to achieve vertical take-off and landing (VTOL), the aircraft comprising:
a jet engine with a downward deflectable propelling nozzle;
an auxiliary power unit with a downward deflectable propelling nozzle; and
a transformable wing comprising a fixed wing, a hydraulic sleeve, an air intake duct including an upper wall and a lower wall, a thin wing connected to the hydraulic sleeve and located between the upper and lower walls, a sliding wing, leading edge flaps, trailing edge flaps, an aileron, and a hinge, the transformable wing being configured, during vertical takeoff/landing, to transform such that a leading end to an air intake duct in a vertical direction is formed on the fixed wing, and the air intake duct is formed internally in and along a direction of the wingspan of the fixed wing to cause air taken in by the jet engine to flow, in a common direction, over upper and lower surfaces of the thin wing, a chord line of the thin wing being in the direction of the wingspan of the fixed wing, thereby generating lift for vertical take-off/landing, the transformable wing being configured, during forward flight, to restore a normal shape in order to reduce drag, the aircraft further including
an assembly, which is an integral and inseparable part of the transformable wing, the assemble including an extended section of air intake duct, an openable and closable leading end to air intake duct in horizontal direction, and an openable and closable leading end to air intake duct in vertical direction.

2. The aircraft according to claim 1 wherein the sliding wing, during the vertical take-off/landing, will slide, under the stretching of the hydraulic sleeve, over the fixed wing and then form, inside the transformable wing, an air intake duct in and along the direction of the wingspan of the fixed wing.

3. The aircraft according to claim 1 wherein the upper end lower surface of the thin wing, during the vertical take-off/landing, will be detached, under the stretching of the hydraulic sleeve, from the fixed wing and the sliding wing, and positioned at the middle between the parallel upper wall and lower wall within the air intake duct that is formed by the fixed wing and sliding wing, with its chord line being in the direction of the wingspan of the fixed wing.

4. The aircraft according to the claim 1, wherein the sliding wing is configured to slide, under the stretching of the hydraulic sleeve, over the fixed wing and then form, inside the transformable wing, an air intake duct.

* * * * *